(12) United States Patent
Ohga et al.

(10) Patent No.: US 6,235,806 B1
(45) Date of Patent: May 22, 2001

(54) OPEN-CELLED RIGID POLYURETHANE FOAM AND METHOD FOR PRODUCING THE SAME

(75) Inventors: Michihiro Ohga; Masato Hayashi; Junnichi Hosaka; Reishi Naka, all of Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/337,686

(22) Filed: Jun. 22, 1999

(30) Foreign Application Priority Data

| Jun. 26, 1998 | (JP) | 10-180726 |
| Apr. 16, 1999 | (JP) | 11-109279 |
| Jun. 17, 1999 | (JP) | 11-170732 |

(51) Int. Cl.$^7$ .................................................. C08G 18/34
(52) U.S. Cl. ........................... 521/155; 264/45.1; 264/48; 264/51; 264/101; 264/102; 264/257; 264/294; 521/51
(58) Field of Search .................... 521/51, 155; 264/45.1, 264/48, 51, 101, 102, 259, 294

(56) References Cited

U.S. PATENT DOCUMENTS

| 5,654,344 | 8/1997 | Falke . |
| 5,698,601 | 12/1997 | Welte . |
| 5,721,284 | 2/1998 | Smits et al. . |
| 5,880,168 | 3/1999 | Heinz . |

FOREIGN PATENT DOCUMENTS

| 195 45 165 | 5/1997 | (DE) . |
| 63-61589 | 11/1988 | (JP) . |
| 06213561 | 8/1994 | (JP) . |

OTHER PUBLICATIONS

Thermophysical Properties of Refrigerator–Application of Evacuated Insulators;*The 10$^{th}$ Anniversary Semiknar of the Founding f the Japan Thermal Material Research Association*; vol. 1; Jun. 30, 1989; Ozaki.

*Primary Examiner*—John M. Cooney, Jr.
(74) *Attorney, Agent, or Firm*—Kilpatrick Stockton LLP

(57) ABSTRACT

In order to provide an open-celled rigid polyurethane foam, which realizes a low material cost per unit volume of the foam and excellent surface smoothness because of its unique structure, and a thermal insulation material comprising the foam, an open-celled rigid polyurethane foam which has an open cell content of not less than 99% in a state that a skin layer is left on the foam is produced by foam molding, preferably multiple-stage compression molding, of foaming components containing a polyol component and an isocyanate component with an equivalent ratio of NCO/OH of about 0.55–0.95, and a blowing agent, preferably water, and a thermal insulation material is produced from the foam preferably subjected to a baking treatment by means of far-infrared ray exposure. Further, in order to provide a vacuum insulation material that does not result waste upon production, and provide good appearance and high reliability when used for products such as freezing and refrigerating apparatuses by using the aforementioned open-celled rigid polyurethane foam, a vacuum insulation material is produced by covering the foam as a whole with a container composed of a gas barrier film, reducing internal pressure of the container, and sealing the container to provide the vacuum insulation material.

8 Claims, 2 Drawing Sheets

OPEN-CELLED RIGID POLYURETHANE FOAM AND METHOD FOR PRODUCING THE SAME

TECHNICAL FIELD

The present invention relates to an open-celled rigid polyurethane foam and a method for producing the same. It also relates to a thermal insulation material or a vacuum insulation material comprising the open-celled rigid polyurethane foam as a component, which can be used as a thermal insulation panel or a thermal insulation material for profile shapes of high quality in various applications such as freezing and refrigerating equipment, freezers, refrigerated vehicles, freezing containers, transportation and storage of LNG and LPG, storage containers, pipe covers, housing panels and the like.

DESCRIPTION OF THE PRIOR ART

Recently, aiming at protection of the ozone layer and prevention of the global warming for global environmental protection, there have eagerly been sought use of less or no flons and energy saving in various production fields, and hence substitution of some materials has been desired. Among such materials, thermal insulation materials including rigid polyurethane foams have been one of the targets of such material substitution.

Therefore, various kinds of technologies have been proposed in the thermal insulation material production field. For example, as a technology for realizing no use of flons, there have been known production methods using water as a blowing agent. Further, aiming at energy saving, there have been proposed, for example, vacuum insulation panel structures prepared by filling a bag composed of a gas barrier metal-plastic laminate film with a core material for maintaining a predetermined shape, for example, inorganic powder or an open-celled body, and sealing the bag under reduced pressure.

Under the circumstance described above, because rigid polyurethane foams comprising open cells have a light weight and exhibit high performance, they are attracting much attention as thermal insulation materials for freezing and refrigerating equipment, in particular, as a core material of the aforementioned vacuum insulation panels, which can contribute to the prevention of global warming.

For example, Japanese Patent Examined Publication No. 63-61589, Japanese Patent Unexamined Publication No. 6-213561, a seminar report of Japan Thermophysical Property Study Group [Nippon Netsu-bussei Kenkyu-kai] (Jun. 30, 1989) and the like proposed to obtain high performance vacuum insulation materials with an open-celled rigid polyurethane foam foamed with water as a core material by using finer cell size or controlling the shape of the cells in the foams.

By the way, most of open-celled rigid polyurethane foams used as the core material in the aforementioned conventional vacuum insulation panels are produced by the double-conveyer method utilizing the so-called rigid slab foam or continuous panel molding, or by compression molding.

However, rigid polyurethane foams obtained by these methods would have a surface layer, called skin layer, in which open cells are not formed. Therefore, open-celled rigid polyurethane foams must currently be obtained by removing such a skin layer. In addition, the volume of the skin layer removed in the aforementioned method reaches as much as 50% of the total volume. The resulting waste is harmful to the protection of global environment, at the same time, reduces productivity, and increase the material cost per unit volume of the foams. Moreover, open-celled rigid polyurethane foams obtained as described above are limited in their shape, lack surface smoothness, and do not have a sufficient mechanical strength depending on the intended use.

On the other hand, a baking treatment for removing gases released from open-celled rigid polyurethane foams has generally been performed by using a circulating hot air oven. However, even after such a baking treatment, gases are released for a long period of time. Therefore, use of a getter agent for adsorbing the gases is essential when the open-celled rigid polyurethane foams are used for thermal insulation materials, especially for vacuum insulation materials. This also leads to reduction of productivity and considerable increase of the product cost, which obstruct wide use of these products.

Water has of course been used as a blowing agent in the production of all of the aforementioned conventional open-celled rigid polyurethane foams for no use of flons. However, such production method reduces the mechanical strength of foams upon foam molding and increases friability (brittleness of foam), and therefore molded foams of high quality have not currently been obtained.

SUMMARY OF THE INVENTION

An object of the present invention is to solve the aforementioned problems and to provide an open-celled rigid polyurethane foam which can be used without removing a skin layer therefrom, can reduce the material cost per unit volume of the foam, and is excellent in the surface smoothness, because of its unique structure, and a method for producing an open-celled rigid polyurethane foam having such a unique structure, and to further provide a thermal insulation material which does not result waste upon production, and affords good appearance and high reliability when used for products such as freezing and refrigerating equipment by using the aforementioned open-celled rigid polyurethane foam, and a method for producing a vacuum insulation material using the aforementioned open-celled rigid polyurethane foam.

The inventors have conducted diligent studies in order to solve the aforementioned problems and, as a result, found that a foam exhibiting a remarkably high open cell content throughout the foam as a whole can be obtained even the skin layer is remained as it is by adjusting a formulating ratio of a polyol component and isocyanate component in a material for rigid polyurethane foam to a certain specific range. Thus, the present invention has been accomplished.

That is, the present invention provides an open-celled rigid polyurethane foam produced by foam molding of foaming components comprising a polyol component, an isocyanate component and a blowing agent, wherein the foam has an open cell content of not less than 99% in a state that a skin layer is left on the foam.

The specific examples of the open-celled rigid polyurethane foam of the present invention include an open-celled rigid polyurethane foam having the aforementioned characteristics, wherein a surface layer of the foam constituting a portion of 0.5 mm thickness from the surface toward the inside of the foam has a density of about 0.9–1.5 times as high as that of a core portion constituting a portion of the foam other than the surface layer, and both of the surface layer and the core portion has an open cell content of not less than 99%.

According to the present invention, there is also provided a method for producing the aforementioned open-celled rigid polyurethane foam of the present invention, which comprises a step of foam molding foaming components containing a polyol component, an isocyanate component and a blowing agent, wherein a content ratio of the polyol component and the isocyanate component is about 0.55–0.95 in terms of equivalent ratio of NCO/OH.

As the blowing agent used for the method for producing the open-celled rigid polyurethane foam of the present invention, water is exemplified as a preferred one. As a specific example of the means for performing the foam molding in the production method of the present invention, a molding process including the following steps (A)–(C) can be mentioned:

(A) a step of mixing foaming components and allowing them to foam freely, (B) the first compression step of compressing the freely rising foam which is freely rising in the step (A) before its gel time, and (C) the second compression step of further compressing the compressed foam obtained in the step (B) before its rise time.

As a specific example of the method of compressing in the steps (B) and (C) in the aforementioned molding process including the steps (A)–(C), the method includes the following steps (B) and (C) can be mentioned:

(B) the first compression step of compressing the freely rising foam which is freely rising in the step (A) to a volume of 40–60% of that of the freely risen foam without any compression in the step (A) before its gel time, and (C) the second compression step of further compressing the compressed foam obtained in the step (B) to a volume of 20–30% of that of the freely risen foam without any compression in the step (A) immediately before its rise time.

The method for producing the open-celled rigid polyurethane foam of the present invention preferably further includes a step of subjecting the foam obtained in the foam molding to a baking treatment by means of far-infrared ray exposure. The baking treatment is preferably carried out immediately after the foam molding.

According to the present invention, there is also provided a thermal insulation material comprising the open-celled rigid polyurethane foam of the present invention or the foam subjected to the baking treatment with far-infrared ray exposure.

According to the present invention, there is further provided a method for producing a vacuum insulation material comprising optionally subjecting the open-celled rigid polyurethane foam of the present invention to the baking treatment with far-infrared ray exposure, inserting the foam into a container composed of a gas barrier film so that the whole foam is covered with the container, reducing internal pressure of the container, and sealing the container to provide the vacuum insulation material.

As a preferred example of the open-celled rigid polyurethane foam used in the method for producing a vacuum insulation material of the present invention, an open-celled rigid polyurethane foam obtained through foam molding performed by the molding process comprising the aforementioned steps (A)–(C) can preferably be mentioned among open-celled rigid polyurethane foams produced by the production method of the present invention.

Further, the method for producing a vacuum insulation material of the present invention preferably comprises subjecting the open-celled rigid polyurethane foam immediately after the foam molding to the baking treatment with far-infrared ray exposure, inserting the foam into a container composed of a gas barrier film so that the whole foam is covered with the container, reducing internal pressure of the container, and sealing the container to provide the vacuum insulation material.

The method for producing a vacuum insulation material of the present invention is used as a method for producing vacuum insulation materials for freezing and refrigerating apparatuses, freezers, refrigerated vehicles, freezing containers, transportation and/or storage of LNG and LPG, storage containers, pipe covers, housing and the like.

The open-celled rigid polyurethane foam of the present invention realizes a low material cost per unit volume of the foam and excellent surface smoothness because of its unique structure. According to the production method of the present invention, the open-celled rigid polyurethane foam of the present invention having a unique structure can be produced with good productivity. Further, thermal insulation materials and vacuum insulation materials that do not result waste upon production, and provide good appearance and high reliability when used for products such as freezing and refrigerating apparatuses can be produced by using the open-celled rigid polyurethane foam of the present invention.

DETAILED DESCRIPTION OF THE INVENTION

The present invention will be explained in detail hereinafter.

(1) Open-celled rigid polyurethane foam of the present invention and method for producing the same The open-celled rigid polyurethane foam of the present invention is an open-celled rigid polyurethane foam produced by foam molding of foaming components comprising a polyol component, an isocyanate component and a blowing agent, wherein the foam has an open cell content of not less than 99% in a state that a skin layer is left on the foam.

The term "skin layer" of the foam, as used in this specification, is referred to a surface portion or surface layer of the foam. As mentioned hereinbefore, because the conventional rigid polyurethane foams cannot have sufficient open cells in the skin layer, removal operation of the skin layer is required after foaming in order to obtain an open-celled rigid polyurethane foam. The open-celled rigid polyurethane foam of the present invention is characterized in that it composed of a rigid polyurethane foam whose open cell content is not less than 99% in a state that a skin layer is left on the foam.

The open cell content can be calculated according to the equation: 100–Cr where Cr is a closed cell content determined according to ASTM-D1940.

As mentioned above, the open-celled rigid polyurethane foam of the present invention has an open cell content of not less than 99% throughout the foam in a state that a skin layer is left on the foam, and such an open cell content is sufficient for use as a core material of vacuum insulation materials and the like.

The density of the open-celled rigid polyurethane foam of the present invention can be suitably selected depending on the use of the form, and it is not particularly limited. However, when the foam is used as a core material of a vacuum insulation material for example, the density is preferably in the range of about 90–150 kg/m$^3$, more preferably in the range of about 100–110 kg/m$^3$.

The density distribution of the open-celled rigid polyurethane foam of the present invention is also not particularly limited like the density of the foam as a whole. However, it is preferred that the density of the surface layer constituting a portion of 0.5 mm thickness from the surface toward the inside of the foam should be close to the density of the core portion constituting a portion of the foam other than the surface layer. Specifically, the density of the surface layer is preferably about 0.9–1.5 times as high as that of the core portion, and more preferably about 1.0–1.3 times as high as that of the core portion. As also for such an open-celled rigid polyurethane foam of the present invention where the density of the surface layer is close to that of the core portion, the foam as a whole has an open cell content of not less than 99%, and therefore both of the surface layer and the core portion have an open cell content of not less than 99%.

Hereinafter, the term "surface layer" refers to a surface layer constituting a portion of 0.5 mm thickness from the surface toward the inside of the foam, and "core portion" refers to a core portion constituting a portion of the foam other than the surface layer, unless otherwise indicated.

The open-celled rigid polyurethane foam of the present invention can be produced by mixing of a blowing agent, a polyol component and an isocyanate component to cause foaming. As a specific production method of the form of the present invention, there can be mentioned the method of the present invention comprising a step of foam molding foaming components containing a polyol component, an isocyanate component and a blowing agent, wherein a content ratio of the polyol component and the isocyanate component is about 0.55–0.95 in terms of equivalent ratio of NCO/OH.

In the production method of the present invention, the content ratio of the polyol component and the isocyanate component is selected to be within a range of about 0.55–0.95 in terms of equivalent ratio of NCO/OH, and thereby the open-celled rigid polyurethane foam of the present invention having an open cell content of not less than 99% throughout the foam in a state that the skin layer is left on the foam can be obtained only by mixing the aforementioned materials to cause foaming, that is, without removing the skin layer after the foam molding like in the conventional methods. This advantage can be obtained because the equivalent ratio of NCO/OH in the aforementioned range disturbs the balance of elongation and strength of the skeletal resin forming the cells, and thereby the cells can be sufficiently broken throughout the foam from the inside to the skin layer.

By the way, the formulating ratio of the polyol component and the isocyanate component in foaming components for conventional open-celled rigid polyurethane foams is selected to be 1–1.2 in terms of equivalent ratio of NCO/OH considering the compression strength of open-celled rigid polyurethane foams obtained after the removal of the skin layer. For example, as described in Japanese Patent Unexamined Publication No. 6-213561, when a foam having a free foaming density of 20 kg/m$^3$ is produced by using water as the blowing agent, the polyol component (A) and the isocyanate component (B) are used in a ratio B/A (weight ratio) of 1.5–2.0, that is, a large amount of the isocyanate component is used. Therefore, the curing property is degraded, and friability is increased as a whole to cause insufficient durability. Thus, good foams cannot have been obtained.

In contrast, according to the present invention, by using an equivalent ratio of NCO/OH of about 0.55–0.95 in the foaming components, which is lower than that conventionally used, the problem of increased friability can be solved, and the cells can be sufficiently broken from the inner part to the skin layer to afford an open-celled rigid polyurethane foam having an open cell content of not less than 99% throughout the foam, more specifically, an open cell content of not less than 99% as for both of the surface layer and the core portion in a state that the skin layer is left as it is.

The production method of the present invention can afford smooth surfaces, and can be adapted to various kinds of shapes, because the skin layer is not required to be removed in order to secure the open cell content unlike the conventional methods. In addition, the method of the present invention results in no waste during production, and therefore it is a gentle system for the global environment, which can also sufficiently meet the future recycling.

The polyol component used in the method of the present invention is not particularly limited, and polyol components commonly used in foaming components for polyurethane foam can be employed. Specifically, polypropylene glycols, polytetramethylene glycols, polyether polyols such as modified versions of these glycols including tolylenediamine polyethers, sucrose polyethers, ethylenediamine polyethers, and the like; polyester polyols such as condensed polyester polyols, lactone polyester polyols, polycarbonate polyester polyols; polybutadiene polyols; acrylic polyols; partially saponified ethylene-vinyl acetate copolymers; phenolic polyols and the like can be exemplified.

The isocyanate component used in the method of the present invention is not particularly limited and isocyanate components commonly used in foaming components for polyurethane foams can be employed. Specifically, polymeric 4,4'-diphenylmethane diisocyanate (polymeric MDI or crude MDI), carbodiimide modified MDI, tolylene diisocyanate and the like can be exemplified.

Most of such ordinary polyol components and isocyanate components conventionally used as foaming components for polyurethane foams are commercially available, and such commercial products can be used for the present invention.

As the blowing agent used for the present invention, HFC, HCFC, cyclopentane, water and the like can be exemplified. While one or more of these can appropriately be selected, it is preferred to use water according to the present invention, since it exhibits ODP (ozone depletion potential)=0, and GWP (global warming potential)≈0, and is highly safe without any risk of explosion and fire.

The foaming components for open-celled rigid polyurethane foam used for the production method of the present invention can includes, in addition to the aforementioned components, various kinds of ingredients used in the ordinary production methods of polyurethane foams, such as a catalyst, chain extender, crosslinking agent, foam stabilizer, cell opener, filler, plasticizer, flame retardant and the like.

As the catalyst, organometallic catalysts, amine compound catalysts such as tertiary amines and amine salts and the like can be mentioned. As the chain extender or the crosslinking agent, glycols can be specifically mentioned. As the foam stabilizer, various kinds of surfactants, preferably silicone surfactants can be specifically mentioned. Further, barium stearate is preferred as the cell opener, and inorganic or organic powders such as calcium carbonate powder is exemplified as the filler.

The foaming components of the open-celled rigid polyurethane foam of the present invention contains the polyol component, the isocyanate component, the blowing agent, and other ingredients such as those mentioned above, and the content ratio of the polyol component and isocyanate component in the foaming components is in the range of about 0.55–0.95, preferably in the range of about 0.60–0.80 in terms of the equivalent ratio of NCO/OH.

If the equivalent ratio of NCO/OH is less than 0.55, the mechanical strength is extremely decreased, and the foam becomes to be likely to shrink. If the equivalent ratio of NCO/OH is more than 0.95, the cells become larger, and it becomes difficult to form open cells in the skin layer.

The amount of the blowing agent used in the production method of the present invention may be the same as that of the blowing agent used in the production of conventional polyurethane foams. For example, when water is used as the blowing agent, it can be used in an amount of 4–8% by weight relative to the content of the polyol component in the foaming components. With regard to the other ingredients formulated in the foaming components, they can be used in the same amounts as commonly used for the production of conventional polyurethane foams.

In the production method of the present invention, the foaming components is prepared in the same manner as in the production of conventional polyurethane foams, for example, by mixing the components by means of a high pressure foaming machine or the like, and thus prepared foaming components is used for the foam molding. The foam molding used for the production method of the present invention may be compression molding during free foaming in a conventional batch system, or continuous system using double-conveyer or the like. The compression molding is preferably a multiple-stage compression molding. The open-celled rigid polyurethane foam of the present invention prepared by the multiple-stage compression molding would have open cells in a crushed shape throughout the foam from the inside portion to the skin layer, and have a resin structure of "fiber piled" structure, for example, like a laminate of non-woven fabric.

As a specific example of the method of the multiple-stage compression molding in the production method of the present invention, a molding process including the following steps (A)–(C) can be mentioned:

(A) a step of mixing foaming components and allowing them to foam freely, (B) the first compression step of compressing the freely rising foam which is freely rising in the step (A) before its gel time, and (C) the second compression step of further compressing the compressed foam obtained in the step (B) before its rise time.

As a specific example of the compressing degree in the aforementioned step (B), such a degree that a volume of the compressed foam obtained in the step (B) is 40–60% of that of the freely risen foam without any compression in the step (A) can be mentioned as preferable. The abovementioned volume of the freely risen foam without any compression in the step (A) means, for example, the volume of the foam which is obtained by allowing the mixture of foaming components to foam freely till rise time in a vessel having an open top, that is, without having any restrictions from above, and to cure it.

As a specific example of the compressing degree in the aforementioned step (c), such a degree such that a volume of the compressed foam obtained in the step (C), namely, the open-celled rigid polyurethane foam of the present invention, is 20–30% of that of the freely risen foam without any compression in the step (A) can be mentioned as preferable. Furthermore, the second compression step of (C) is preferably carried out immediately before its rise time.

The first compressing in the step (B) and the second compressing in the step (C) may be completely performed by a single compressing operation or a plurality of compressing operations, respectively. The second compression is preferably performed in the same direction as the first compression because in this manner it is easy to form the fiber piled structure in the foam by that.

The second compression step is performed to the compressed foam obtained in the step (B), the gelation of which has progressed and the resin strength of which has appeared and which has the uniform density from the surface layer to the core portion, before rise time. Thus, the cells can be completely broken and opened with each other throughout the foam from the inside to the skin layer by the crushing effect in the second compression step. That is, the foam having an open cell content of not less than 99% throughout the foam including the skin layer can be obtained by performing the multiple-stage compression at the abovementioned timing.

The terms "cream time", "gel time" and "rise time", as used in the present specification, are defined respectively as follows. Namely, in the foam molding step, "cream time" refers a time when a liquid foaming mixture starts the foaming after the foaming components are mixed, "gel time" refers a time when the foaming mixture begins to make a string by a glass rod which is stuck into the foam and then pulled out of it, and "rise time" refers a time when the foaming ceases.

The molding process comprising the aforementioned steps (A)–(C) will be explained in more detail referring to the schematic explanatory views shown in FIGS. 1(1)–(4) and comparing with the schematic explanatory views in the method for producing the freely risen foam without any compression step shown in FIG. 2(1)–(2).

FIG. 1(1) and FIG. 1(2) are schematic explanatory views of the aforementioned step (A). FIG. 1(1) shows a foaming mixture 4 obtained by sufficiently mixing the aforementioned components and introduced into a cavity formed between an upper mold 2 and a lower mold 3 of a metallic mold. FIG. 1(2) shows the freely rising foam 5 obtained by the free foaming of the foaming mixture introduced in the above (1), which fills the cavity between the upper mold 2 and the lower mold 3. Materials and shape of the mold used here can suitably be selected. The mold may be warmed as required.

On the other hand, FIG. 2 shows schematic explanatory views in the method for producing the freely risen foam without any compression step. In FIG. 2(1), it shows that the only lower mold 3 is used as a metallic mold for the producing the freely risen foam and the same foaming mixture 4 as that used in FIG. 1(1) is introduced into the lower mold 3 in the same amount of that in FIG. 1(1). FIG. 2(2) shows the freely risen foam X obtained by the freely foaming of the foaming mixture introduced into the lower mold 3 in the above FIG. 2(1) till rise time without any restrictions from above and continuously curing in the lower mold 3.

FIG. 1(3) is a schematic explanatory view of the aforementioned step (B), which shows a compressed foam 6 which is obtained by gradually pushing in the upper mold 2 with a press 1 so as to compress the freely rising foam 5 (the first compression). The first compression is preferably performed so that the obtained compressed foam 6 has a volume of 40–60% of the freely risen foam X without any compression which is shown in FIG. 2(2). The first compression using the press 1 is carried out before its gel time. Although the timing of the first compression is not particularly limited so long as it is performed before the gel time, it is preferably performed about 5–10 seconds before the gel time. The gel time may be measured beforehand by performing a preliminary experiment under a condition similar to the production condition, since it varies depending on the nature of the foaming mixture, mold temperature and the like.

FIG. 1(4) is a schematic explanatory view of the step (C), which shows a 2-step compressed foam 7 which is obtained through further compression of the compressed foam 6 by further pushing in the upper mold 2 with the press 1 (the second compression). The second compression is preferably performed so that the obtained 2-step compressed foam 7 has a volume of 20–30% of the aforementioned freely risen foam X without any compression which is shown in FIG. 2(2). Although the timing of the second compression by the press 1 is not particularly limited so long as it is performed after the first compression is completed and before the rise time, it is preferably performed immediately before the rise time. The rise time is also preferably determined beforehand by a preliminary experiment or the like, similar to the gel time.

The 2-step compressed foam 7, which is obtained after the second compression and the release from the mold, is an open-celled rigid polyurethane foam of the present invention. FIG. 3 shows an exemplary open-celled rigid polyurethane foam of the present invention obtained by the aforementioned process. FIG. 3(*a*) is a perspective view and FIG. 3(*b*) is a cross-sectional view thereof. The open-celled rigid polyurethane foam 7 shown in FIG. 3 is an open-celled rigid polyurethane foam of the present invention having a surface layer density of about 0.9–1.5 times as high as that of the core portion. In the open-celled rigid polyurethane foam shown in FIG. 3(*b*), both of the surface layer 7*a* constituting a portion of 0.5 mm thickness from the surface toward the inside of the foam and a core portion 7*b* have an open cell content of not less than 99%. The density of the surface layer 7*a* is about 0.9–1.5 times of that of the core part 7*b*.

A production method of the present invention preferably further comprises a step of subjecting the foam obtained in the foam molding to a baking treatment by means of far-infrared ray exposure. The baking treatment is preferably carried out immediately after the foam molding, for example, when the metallic mold is employed for the foam molding, immediately after the release from the mold. While the baking time depends on the sizes of the oven and the object to be treated and the like, it may be approximately 0.2–1 hours.

In this baking treatment with far-infrared exposure, the foam can be baked at a temperature substantially constant from the core portion to the surface layer. By this process, a foam which does not release gases over a long period of time and has a high compression strength can be obtained. This, presumably, is for the following reasons. Because the wavelength band of 5–20 $\mu$m of far-infrared ray corresponds to the absorbing characteristic of the polyurethane resin, resonance vibration is generated by the wavelength interaction. In addition, the internal heat generation can stably and directly affect the adsorbed gases such as air and water from the core portion to the surface portion, and promote dissipation thereof, and the so-called after curing effect often observed for thermosetting resins is exerted to a greater extent compared with a conventional hot air dry oven to enhance the strength of the resin constituting the cell framework.

The aforementioned open-celled rigid polyurethane foam of the present invention can be used, for example, as a thermal insulation material as described below.

(2) Thermal insulation material of the present invention

The thermal insulation material of the present invention comprises the aforementioned open-celled rigid polyurethane foam of the present invention, or such a foam that has been subjected to the baking treatment with far-infrared ray exposure. The method for baking the open-celled rigid polyurethane foam of the present invention is the same as explained for the production method of the open-celled rigid polyurethane foam.

By using the aforementioned open-celled rigid polyurethane foam of the present invention, or the foam subjected to the baking treatment with far-infrared ray exposure, the heat insulation material of the present invention can have excellent strength and a smooth surface, and thus products utilizing it can have high quality, e.g., improved appearance. Specifically, the heat insulation material of the present invention can be used in inside of walls of appliance requiring heat insulation characteristic. For example, it is placed in a space formed between an outer box and an inner box of a refrigeration or freezing apparatus or the like.

The aforementioned open-celled rigid polyurethane foam of the present invention can be used as a core material of a conventionally known type vacuum insulation material, which is obtained by covering an open-celled foam as a core material with a gas barrier film and sealed under reduced pressure. Such a vacuum insulation material of the present invention can be prepared, for example, by the following production method according to the present invention.

(3) Method for producing vacuum insulation material of the present invention

The method for producing the vacuum insulation material of the present invention is characterized in that the vacuum insulation material is produced by optionally subjecting the open-celled rigid polyurethane foam of the present invention to the baking treatment with far-infrared ray exposure, inserting the foam into a container composed of a gas barrier film so that the whole foam is covered with the container, reducing internal pressure of the container, and sealing the container to provide the vacuum insulation material.

The open-celled rigid polyurethane foam of the present invention used here for the method for producing the vacuum insulation material of the present invention can be obtained by the aforementioned production method of the open-celled rigid polyurethane foam of the present invention. However, among those open-celled rigid polyurethane foams obtained by such a method, open-celled rigid polyurethane foams obtained by the molding process comprising the aforementioned steps (A)–(C) are preferably used for the method for producing the vacuum insulation material of the present invention. The method for subjecting the open-celled rigid polyurethane foam of the present invention to the baking treatment is the same as that explained for the production method of the open-celled rigid polyurethane foam.

The method for producing a vacuum insulation material of the present invention preferably comprises subjecting the open-celled rigid polyurethane foam immediately after the foam molding to the baking treatment with far-infrared ray exposure, inserting the foam into a container composed of a gas barrier film so that the whole foam is covered with the container, reducing internal pressure of the container, and sealing the container to provide the vacuum insulation material.

Although the shape of the container used for the production method of the vacuum insulation material of the present invention is not particularly limited, a bag shape is preferred considering durability of gas barrier films with various structures during the vacuum molding. Further, in the production process of the present invention, inside of the container is preferably evacuated to about $1 \times 10^{-1}$ to $1 \times 10^{-3}$ torr. The expression "evacuating inside of container" as used in the production method of the present invention specifically means to evacuate all of cavities including cavities inside the open-celled rigid polyurethane foam inserted into the container and cavities between the container and the foam.

As the gas barrier film constituting the container used for the present invention, materials conventionally used as gas barrier films for vacuum insulation materials can be used without particular limitation. Specifically, metal-plastic laminate films can be mentioned. More specifically, three-layer laminate films of polyethylene terephthalate film/aluminum foil/high density polyethylene film can be exemplified. When a laminate film of such a three-layer structure is used for the present invention, the high density polyethylene film should be inside the container.

As a similar laminate film, there are films using a stainless steel foil instead of the aluminum foil. These films are effective for avoiding heat bridging because of the small thermal conductivity thereof. If a technique for producing a further thinner stainless steel foil is established, heat insulation of higher grade can be expected. An acrylonitrile film, vinyl acetate copolymer film or the like can also be used instead of the polyethylene terephthalate film or the high density polyethylene film.

In the production method of the vacuum insulation material of the present invention, the sealing of the evacuated container is obtained by heat sealing of the gas barrier film or the like. When the sealing is obtained by means of heat sealing, a portion of the film to be heat-sealed preferably consists of a high density polyethylene film. This is because the high density polyethylene film is more excellent in a heat sealing property than acrylonitrile film and therefore affords highly reliable gas barrier property after sealing.

The vacuum insulation materials produced by the method of the present invention can afford good appearance of the products utilizing them, because the open-celled rigid polyurethane foam used as the core material is prepared without removing the skin layer and hence has a smooth core surface. By processing the metallic mold used for the production of the core material to have a grain pattern or the like, the design of the product can be improved without an additional processing. Further, by using the aforementioned open-celled rigid polyurethane foam of the present invention, which is optionally subjected to baking treatment with far-infrared ray exposure as required, quality of the products can be improved, for example, excellent mechanical strength can be obtained. Therefore, it can be widely used not only in the field of freezing and refrigerating equipment, but also for various applications such as freezers, storage containers, pipe covers, housing and the like.

The open-celled rigid polyurethane foam of the present invention has a low heat deformation temperature, because the NCO/OH equivalent ratio of the foaming components used for the production is about 0.55–0.95. In addition, it has a small Young's modulus in flexure and good follow-up ability to deformation, because it has the piled fiber-like resin structure as mentioned above. Accordingly, for example, a vacuum insulation material in a plate shape using the aforementioned foam can be heat-treated at 80–150° C. for several minutes, and then formed into a vacuum insulation material of various shapes, for example, shapes having curvature such as a cylindrical shape.

Moreover, the vacuum insulation material, which is prepared by subjecting the open-celled rigid polyurethane foam immediately after the foam molding to the baking treatment with far-infrared ray exposure, inserting the foam into a container composed of a gas barrier film so that the whole foam is covered with the container, reducing internal pressure of the container, and sealing the container to provide the vacuum insulation material, does not release gases for a long period of time. Therefore, a getter agent, i.e., a gas absorbing agent, becomes unnecessary, which has been required for the conventional vacuum insulation materials using a conventional open-celled rigid polyurethane foam as a core material. Of course, when the open-celled rigid polyurethane foam baked under gentle conditions (e.g., by using a hot-air drying machine) is employed, the getter agent can be used in order to improve safety as for intrusion of external gases or dispersion of adsorbed gases from the foam. As for the production method of such a vacuum insulation material, process steps can be designed as a series of continuous steps, and therefore it is preferred also in view of the production efficiency.

EXAMPLES

Examples of the present invention will be explained hereinafter.

Examples 1, 2 and Comparative Examples 1, 2

Figure 1:
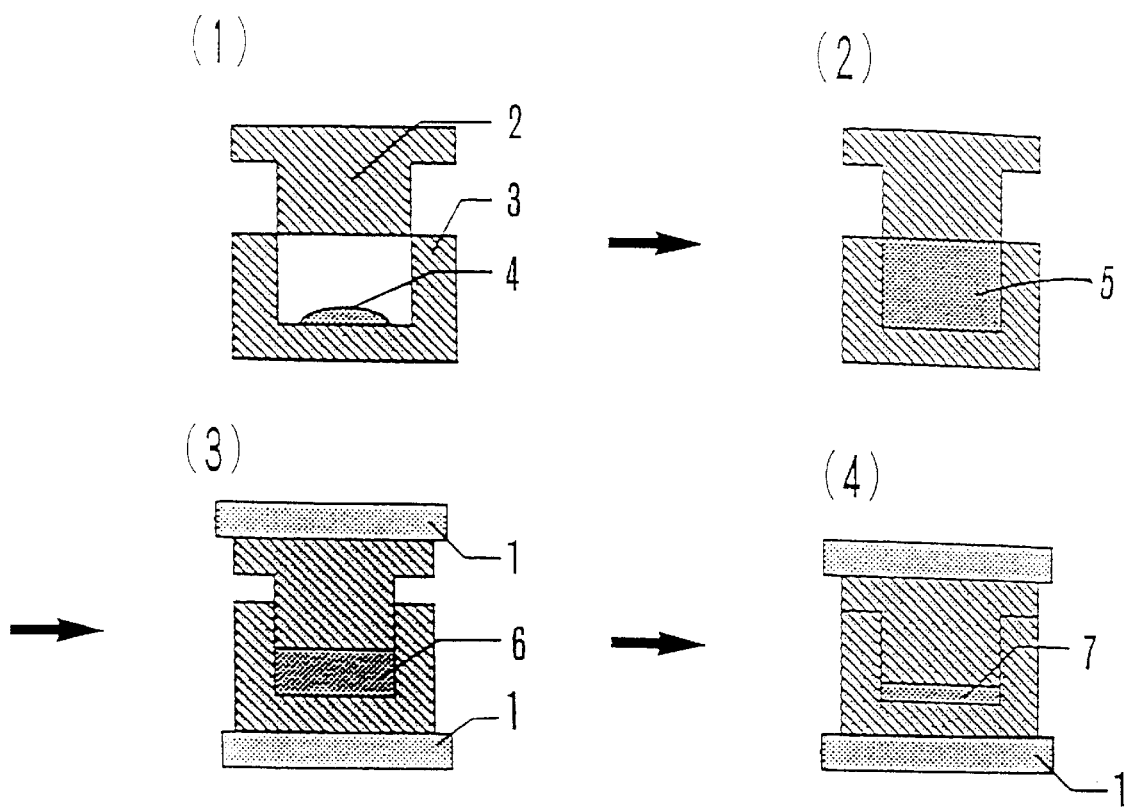
FIG. 1 includes explanatory views of exemplary production steps in the method for producing the open-celled rigid polyurethane foam of the present invention.

Open-celled rigid polyurethane foams of these examples were prepared according to the production steps shown in FIG. 1. Further, for comparison, freely risen rigid polyurethane foam without any compression was prepared according to the production steps shown in FIG. 2(1)–(2).

Foaming mixture 4 shown in FIG. 1(1) was prepared by mixing the following components using a high-pressure foaming machine; 100 parts by weight of a mixture of 300 mg KOH/g of tolylenediamine polyether, 450 mg KOH/g of sucrose polyether and 500 mg KOH/g of ethylenediamine polyether in a ratio of 5:3:2 as a polyol component; 6 parts by weight of water as a blowing agent; 1.0 part by weight of foam stabilizer ("SZ-1919", trade name of Nippon Unicar); 0.5 part by weight of catalyst ("Kaolizer No. 31", trade name of Kao); 4 parts by weight of barium stearate as a cell opener; and 132 parts by weight (NCO/OH equivalent ratio 0.7; Example 1), or 113 parts by weight (NCO/OH equivalent ratio 0.6; Example 2) of crude MDI "44V-20" (trade name of Sumitomo Bayer Urethane) as an isocyanate component.

Figure 2:
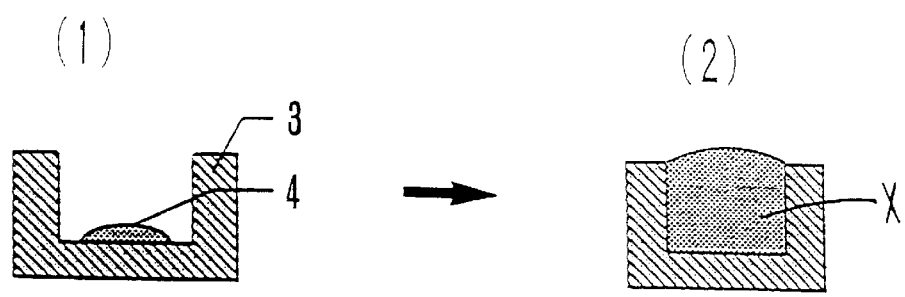
FIG. 2 includes explanatory views of exemplary production steps in the method for producing the freely risen foam without any compression step using the foaming components of the open-celled rigid polyurethane foam of the present invention.

As shown in FIG. 2(1), the same foaming material 4 as that used in Example 1 or 2 was introduced into a lower mold 3 of aluminum mold in a state that an upper mold 2 (not shown) was pulled up satisfactorily. Then, the foaming material was allowed to foam freely till rise time and to cure completely to obtain a freely risen rigid polyurethane foam X which is shown in FIG. 2(2). During the above step, the gel time and the rise time were measured. After the obtained freely risen foam X was released from the lower mold 3, the density thereof was measured as 25 kg/m³. Both of the freely risen foams obtained above had the same density.

As shown in FIG. 1(1), the foaming mixture 4 was introduced into a cavity formed between an upper mold 2 and a lower mold 3 of aluminum mold, and the foaming mixture 4 introduced in the step of FIG. 1(1) was allowed to rise freely so that the cavity formed between the upper mold 2 and the lower mold 3 should be filled with the freely rising foam 5 as shown in FIG. 1(2). Right after the cavity was filled with the foam, 5 to 10 seconds before its gel time, as shown in FIG. 1(3), the foam 5 was compressed by gradually pushing in the upper mold 2 with the press 1 (first compression) to obtain a compressed foam 6 having a volume of 60% of that of the freely risen foam X without any compression which is shown in FIG. 2(2). After this state was maintained for about 5–20 seconds, that is, immediately before the rise time, as shown in FIG. 1(4), the compressed foam 6 was further compressed by further pushing in the upper mold 2 with the press 1 (second compression) to obtain a 2-step compressed foam 7 having a volume of 25% of that of the freely risen foam X without any compression which is shown in FIG. 2(2).

In the steps of FIGS. 1(1) and 1(2), the temperature of the mold was adjusted to 50–55° C.

Figure 3:
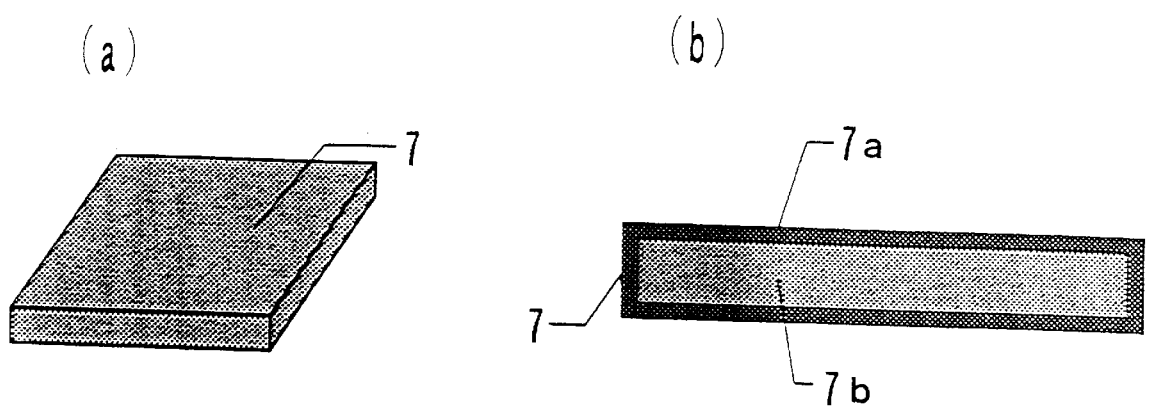
FIG. 3 includes schematic views of an exemplary open-celled rigid polyurethane foam of the present invention. (a) is a perspective view, and (b) is a cross-sectional view thereof.

FIG. 3 shows the 2-step compressed foam 7 (open-celled rigid polyurethane foam) after the release from the mold, and (a) is a perspective view, and (b) is a cross-sectional view thereof open cell content and density of the surface layer 7a, which constituted a portion of 0.5 mm thickness from the surface toward the inside of the open-celled rigid polyurethane foam 7, and the core portion 7b shown in FIG. 3(b) were measured. The results are shown in Table 1. For reference, in the process of each of Examples 1 and 2, the compressed foam 6 was released from the mold after the first compression, and open-celled content of a surface layer constituting a portion of 0.5 mm thickness from the surface toward the inside of the foam, and a core portion constituting the other portion of the foam was measured. These results are also shown in Table 1.

For comparison, rigid polyurethane foams were prepared in a manner exactly the same as that of the aforementioned examples excepting that the NCO/OH equivalent ratio of the foaming components was 1.0 (Comparative Example 1) or 0.5 (Comparative Example 2). For these foams, open cell content and density of a surface layer constituting a portion of 0.5 mm thickness from the surface toward the inside of the foam, and the core portion constituting the other portion of the foam were measured. For reference, in the process of each of Comparative Examples 1 and 2, the compressed foam 6 was released from the mold after the first compression, and open cell content of a surface layer constituting a portion of 0.5 mm thickness from the surface toward the inside of the foam, and a core portion constituting the other portion of the foam was measured. These results are also shown in Table 1.

The open cell content was calculated by measuring a closed cell content (Cr) according to ASTM-D1940, and subtracting the resulting value from 100 as mentioned above. It was evaluated according to the following criteria.

(Evaluation criteria)
  ○: Open cell content of not less than 99%
  Δ: Open cell content of not less than 90% and less than 99%
  X: Open cell content of less than 90%

TABLE 1

|  | Example 1 | Example 2 | Comparative Example 1 | Comparative Example 2 |
|---|---|---|---|---|
| NCO/OH equivalent ratio | 0.7 | 0.6 | 1.0 | 0.5 |
| Open cell content | | | | |
| After first compression | | | | |
| Core portion | ○ | Δ | ○ | Δ |
| Surface layer | Δ | Δ | x | Δ |
| After second Compression | | | | |
| Core portion | ○ | ○ | ○ | ○ |
| Surface layer | ○ | ○ | x | Δ |
| Density (kg/m³) | | | | |
| Core portion | 96 | 99 | 88 | 103 |
| Surface layer | 115 | 112 | 125 | 112 |
| Over all | 100 | 105 | 103 | 106 |
| Surface/Core | 1.20 | 1.13 | 1.42 | 1.09 |

It is clear from the results that, if a rigid polyurethane foam is produced by the production method of the present invention, that is, by using an NCO/OH equivalent ratio in the foaming components within the range of about 0.55–0.95, an open-celled rigid polyurethane foam of the present invention whose open cell content is not less than 99% throughout the over all foam in a state that the skin layer is remained can be obtained. It can be seen that all of the open-celled rigid polyurethane foams obtained in the above examples are those having a density of the surface layer constituting a portion of 0.5 mm thickness from the surface toward the inside of the foam of about 0.9–1.5 times as high as that of a core portion constituting a portion of the foam other than the surface layer, and an open cell content of not less than 99% in both of the surface layer and the core portion.

Examples 3–6

An open-celled rigid polyurethane foam prepared in the same manner as that of Example 1 was subjected to a baking treatment at 130–150° C. in a far-infrared ray radiation oven for 0.5 hour (Example 3) or 1 hour (Example 4) immediately after the release from the metallic mold. For comparison, the baking treatment was carried out in the exactly same manner as that of Example 3 or 4 except that an ordinary circulating hot air oven was used instead of the far-infrared ray radiation oven, for 0.5 hour (Example 5) or 1 hour (Example 6). Physical properties of the baked products (Examples 3–6) including residual adsorbed gas content, thermal conductivity, compression strength and the like were measured. The results are shown in Table 2.

The residual adsorbed gas content is represented by percentage of the adsorbed gas content of the baked products relative to the adsorbed gas content of the open-celled rigid polyurethane foams measured immediately after the release from the mold. The adsorbed gas content of each foam was measured by mass gas chromatography. The compression strength was measured according to JIS K-7220, and the thermal conductivity was measured at an average temperature of 10° C. with a thermal conductivity measurement apparatus manufactured by Eiko Instruments Trading Co., Ltd. (trade name, HC-074).

TABLE 2

|  | Example 3 | Example 4 | Example 5 | Example 6 |
|---|---|---|---|---|
| Apparatus for baking Treatment | Far-IR radiation Oven | | Circulation hot air oven | |
| Processing time (Hour) | 0.5 | 1 | 0.5 | 1 |
| Residual adsorbed gas content (%) | 0.02 | 0.01 | 2.8 | 1.8 |
| Compression strength (kg/cm$^2$) | 1.15 | 1.16 | 0.73 | 0.82 |
| Thermal conductivity (kcal/mh ° C.) | 0.028 | 0.028 | 0.033 | 0.031 |

As shown in Table 2, it was understood that the baking in the far-infrared radiation oven afforded more excellent properties of the products, that is, extremely smaller residual adsorbed gas content, higher compressive strength, and more stable thermal conductivity, compared with the baking in the conventional circulating hot air oven.

According to the common knowledge, it would be expected that if the baking treatment time is prolonged, the residual adsorbed gas content will be decreased and the compression strength of the foam will be improved. However, it is important within how short period of time an object can be treated in the production process, and in this point of view, the far-infrared ray treatment is effective. Addition of vacuum evacuation will be able to further shorten the processing time.

Examples 7–9

An open-celled rigid polyurethane foam prepared in the same manner as in Example 1, and subjected to a baking treatment in a far-infrared ray radiation oven at 130–150° C. for 0.5 hour immediately after the release from the metallic mold (a foam similar to that obtained in Example 3, referred to as "Molded foam I" hereinafter), an open-celled rigid polyurethane foam prepared in the same manner as in Example 2, left for 1 day after the release from the metallic mold, and subjected to a baking treatment in a far-infrared ray radiation oven at 130–150° C. for 0.5 hour (referred to as "Molded foam II" hereinafter), and open-celled rigid polyurethane foam prepared in the same manner as in Example 2, and not subjected to a baking treatment (referred to as "Molded foam III" hereinafter) were each vacuum packaged as a core material in the manner described below to produce vacuum insulation materials. The vacuum insulation materials were produced without a getter agent for Molded foams I and II, and with a getter agent for Molded foam III. As the getter agent, COMBOGETTER (trade name) manufactured by Saes Getters Japan Co., Ltd. was used in an amount of 10 g per one vacuum insulation material (size of the core material ; 200×200×15 mm).

The obtained three kinds of vacuum insulation materials (Examples 7–9) were examined for change of thermal conductivity with time. The results are shown in Table 3. The thermal conductivity was measured by a thermal conductivity measuring apparatus manufactured by Eiko Instruments Trading Co., Ltd. (trade name, HC-074) at an average temperature of 10° C. as in the above Examples.

<Method of Vacuum Packaging>

Figure 4:
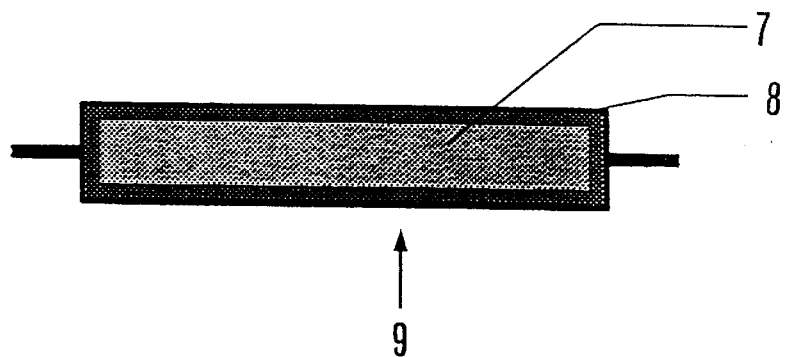
FIG. 4 is a cross-sectional view of an exemplary vacuum insulation material of the present invention.

Molded foam I, II and III were each covered with a bag composed of a gas barrier film, the pressure of the inside was reduced to 0.01 torr, and then the bag was sealed to obtain vacuum insulation materials 9 shown in FIG. 4. In case that the getter was contained, 10 g of the getter was put between the molded foam 7 and the bag 8 when covering the molded foam with the bag, and the bag was evacuated and sealed likewise to obtain a vacuum insulation material containing the getter.

In FIG. 4, the bag 8 is composed of a laminate of a polyethylene terephthalate film, aluminum foil and high density polyethylene film laminated in this order from the outside. Although a container produced by vacuum molding can be used instead of the bag, the bag is preferred because the container is likely to lose its gas barrier property when the aluminum foil is broken during the vacuum molding.

TABLE 3

| | Aging | | | Thermal | | | |
|---|---|---|---|---|---|---|---|
| | | | Baking | Conductivity (kcal/mh ° C.) | | | |
| Example | Molded foam | Getter | Treatment | 1st day | 7th day | 30th day | 60th day |
| Example 7 | I | Not contained | Subjected | 0.004 | 0.0042 | 0.0043 | 0.0045 |
| Example 8 | II | Not contained | Subjected | 0.005 | 0.006 | 0.007 | 0.008 |
| Example 9 | III | Contained | Not subjected | 0.005 | 0.008 | 0.009 | 0.010 |

It was confirmed from these results that the vacuum insulation material containing no getter, which was obtained by a continuous production line consisting of compression molding→far-infrared ray baking treatment→vacuum packaging, was preferred as the vacuum insulation material of the present invention in view of stability of the thermal conductivity.

As explained above, use of the open-celled rigid polyurethane foam of the present invention as thermal insulation materials or vacuum insulation materials is effective for global environmental protection, because it results no waste upon production. In addition, by using water as a blowing agent as in the above examples, non-flon production can be achieved, and this may contribute to the ozone layer protection, prevention of global warming and the like.

Moreover, by using the above-obtained vacuum insulation material having stable thermal conductivity and high mechanical strength, and requiring no getter in a product as a thermal insulation material, the product can have improved appearance and stable quality in addition to high thermal insulation property, and the product cost can be markedly reduced because of the reduced material cost and the improved production efficiency. Further, by producing this vacuum insulation material in a continuous production line, thermal insulation materials can be produced with high quality, high reliability and low cost. Therefore, it becomes possible to provide thermal insulation materials effective for protection of the ozone layer, prevention of the global warming and the like at a low cost, and this can contribute to the society.

What is claimed is:

1. A method for producing an open-celled rigid polyurethane foam having a void ratio of more than 99% prepared from a polyol component, an isocyanate component, and a blowing agent, comprising the steps of:

(A) mixing a polyol component and an isocyanate component under the condition that the mole ratio of NCO/OH is substantially in the range of 0.55–0.95 with the blowing agent to obtain a freely risen foam;

(B) compressing the freely risen foam obtained in the step (A) before its gel time to obtain a compressed foam; and then (C) further compressing the compressed foam obtained in step (B) just before its rise time to obtain a further compressed foam.

2. The method of claim 1, wherein step (B) is to compress the freely risen foam obtained in step (A) to a volume of 40–60% of that of the freely risen foam, and step (C) is to compress the compressed foam obtained in step (B) to a volume of 20–30% of that of the freely risen foam.

3. The method of claim 1, which further comprises the step of:

(D) exposing the further compressed foam to far-infrared rays as a baking treatment to obtain a molded foam.

4. A thermal insulation material comprising the open-celled rigid polyurethane foam produced by the method of claim 1.

5. A thermal insulation material comprising the open-celled rigid polyurethane foam produced by the method of claim 3.

6. The method of claim 1, which further comprises the steps of:

(E) inserting the further compressed foam obtained in step (C) into a container composed of a gas barrier film so that the whole part of the molded foam is covered with the container; and (F) sealing the container by reducing internal pressure of the container to obtain a vacuum insulation material.

7. The method of claim 3, which further comprises the steps of:

(E) inserting the molded foam obtained in step (D) into a container composed of a gas barrier film so that the whole part of the molded foam is covered with the container; and (F) sealing the container by reducing internal pressure of the container to obtain a vacuum insulation material.

8. The method of claim 1, wherein the vacuum insulation material is for freezing and refrigerating apparatuses, freezers, refrigerated vehicles, freezing containers, transportation and/or storage of LNG and LPG, storage containers, pipe covers, or housing.

* * * * *